United States Patent Office 3,541,153
Patented Nov. 17, 1970

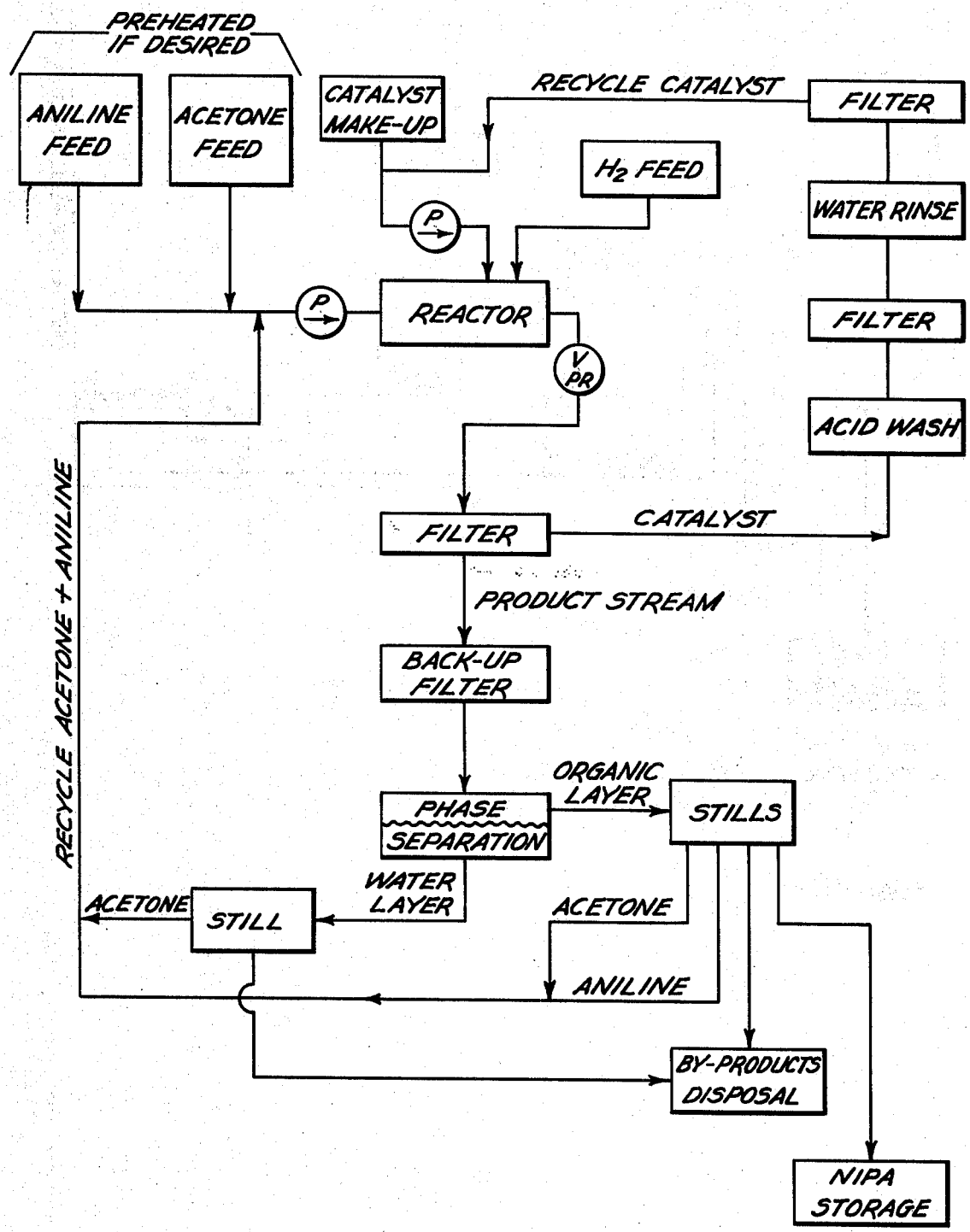

3,541,153
REDUCTIVE ALKYLATION OF ANILINE AND NITROBENZENE
Robert L. Sandridge, Proctor, W. Va., assignor to Mobay Chemical Company, Pittsburgh, Pa., a corporation of Delaware
Filed July 21, 1966, Ser. No. 566,981
Int. Cl. C07c 85/08, 85/10
U.S. Cl. 260—577         5 Claims

ABSTRACT OF THE DISCLOSURE

Amines and oxidation precursors thereof are reductively alkylated by a process which comprises hydrogenating a mixture of the amine or oxidation precursor thereof and a ketone in a ratio of ketone to amine or its precursor of at least about 1.1:1 in the presence of a platinum or palladium catalyst, at least about 1.5 parts of a monocarboxylic acid having from 1 to 4 carbon atoms or a halogen acid and at least about one percent by weight of the reaction mixture of water, at a temperature of at least about 80° C. and under a pressure of at least 500 p.s.i.

---

This invention relates to the reductive alkylation of amines and oxidation precursors thereof by means of ketones and a hydrogenation catalyst-promoter system.

Many methods have been proposed for the reductive alkylation of amines and nitro as well as nitroso and azo compounds by means of aldehydes or ketones in the presence of hydrogen gas and a hydrogenation catalyst. These methods all suffer from inherent disadvantages such as, for example, low yields, long reaction times, and deactivation of expensive hydrogenation catalysts after only a few uses. Thus, a continuous process adaptable to plant production has not been feasible.

It is therefore an object of this invention to provide a process for the production of alkylated amines which is devoid of the foregoing disadvantages.

It is a further object of this invention to provide a process for the reductive alkylation of amines and oxidation precursors thereof which is rapid, continuous, efficient and results in high conversion rates and high yields.

Another object of this invention is to provide a rapid, continuous method for the reductive alkylation of amines and oxidation precursors thereof which includes the rapid, efficient, and continuous regeneration of the hydrogenation catalyst so that it may be used at least ten times as long as the hydrogenation catalyst of the prior art processes are capable of being used.

The foregoing objects and others which will become apparent from the following description are accomplished in accordance with this invention as illustrated in the accompanying drawing which depicts in flow-sheet form, the continuous production of N-isopropyl aniline, for example. The process of the invention for the reductive alkylation of amines and/or their oxidation precursors, as more fully described hereinafter, takes place in a very short time, that is, between about five and ten minutes, when a mixture of the amine or its precursor, and the ketone are hydrogenated in the presence of a catalytic amount of a catalyst such as platinum or palladium and a promoter system containing at least about 1.5 parts of an organic monocarboxylic acid such as acetic acid or a halogen acid such as hydrochloric acid per 100 parts of the amine or its precursor and at least about 1% by weight of the reaction mixture of water, at a temperature of not less than about 80° C. and under a pressure of not less than about 500 p.s.i., and preferably 1000 p.s.i. or greater.

In a continuous process as schematically depicted in the accompanying drawing, the amine or an oxidation precursor thereof such as the unreduced nitro form of the amine, and the ketone may be preheated if desired to ensure minimum sojourn time and fed into a reactor into which the catalyst and promoter are also fed under a hydrogen pressure from a hydrogen feed of at least about 500 p.s.i. The temperature to which the reactants are preheated and the temperature in the reactor are at least about 80° C. The reaction takes between five and ten minutes to complete and the flow rate of reactants, catalyst and promoter into the reactor are so regulated that the reactants are continually flowing into, and the reaction product out of, the reactor. Upon leaving the reactor, the pressure is decreased and the catalyst is filtered off. The phases of the product stream are separated. The product is taken off and the by-products are disposed of while the unreacted ketone and amine are recycled. The catalyst is washed with a halogen acid such as HCl, HBr, HI, or nitric or phosphoric acid or the like, filtered, rinsed with water, filtered and recycled. Very little of the ketone and amine compound remain to be recycled, however, since the conversion for a single pass through the reactor is over 90% and the yields are 95% or better based on the amine or its precursor actually consumed.

The method for regenerating the catalyst in the process of this invention results in a rejuvenated catalyst which can be used up to 50 times or more before it becomes inefficient. This in itself is an unexpected but advantageous result since platinum catalysts under these conditions are generally efficient only for about four usages before a marked decrease in catalytic activity occurs. The quick regeneration of the catalyst to a strength approximating its original effectiveness and the combination of this factor with the unique promoter system under the temperature and pressure conditions outlined herein results in a completed reaction within 10 minutes with about 90% or better conversion of the reactants into the alkylated product and a yield of 95% or more on a consistent, reproducible, and continuous basis.

The molar ratio of the reactants used in the process of this invention may be as low as 1.1 mols of the ketone per mol of the amine or its unreduced precursor. The upper limit is only dictated by practical considerations and may be as high as 5 to 1 or higher. The only problem which presents itself with such increased concentrations of ketone to amine or the precursor thereof is that there is correspondingly more of the ketone to be separated and recycled resulting in added and excess bulk in the system thus decreasing the handleability of the reacting materials as well as the throughput of the system and ease of recovery of the product. A range of acetone to amine or an oxidized amine precursor of from about 1.1:1 to about 1.5:1 represents the best compromise between throughput and yield.

The amount of acid to be used in the promoter system for the reductive alkylation of the amine or its precursor may be as low as 1.5 parts per 100 parts of the amine or precursor. The upper limit is only dictated by practical considerations and may be as high as 4 parts per 100 parts of the amine or its precursor or higher. The only problem which presents itself with such increased concentrations of the acid is that the excess is not needed in the reaction and is wasted. The acid may be any organic monocarboxylic acid, but is preferably one having from about 1 to about 4 carbon atoms such as, for example, formic acid, acetic acid, propionic acid, butyric acid and the like. Most preferably, however, acetic acid is used. The acid may also be a halogen acid such as, for example, hydrochloric acid, hydrofluoric acid, hydrobromic acid, hydriodic acid and the like. Most preferably, however, hydrochloric acid is used.

Also critical in the practice of this invention is the presence of water in the reaction mixture. The water serves as part of the promoter system to speed up and effectuate the reaction with maximum conversion of the reactants. It is though that the water serves to ionize the acid promoter and thus increase the ionic strength, changing the kinetics of the reaction, although it is not intended that the operation of the invention be bound to any such theory of its mechanism. From about 1 to about 20% by weight or more of water based on the reaction mixture should be used, the lower limit being the minimum possible amount required to bring about the reaction in accordance with this invention, and the upper limit being dictated solely by the bounds of practicality. More water may be used if desired, but the added quantity merely increases the bulk of the reactants and decreases the handleability of the reacting materials as well as the throughput of the system and the ease of recovery of the product.

The catalyst to be used in the process of the invention is either platinum or palladium, preferably in a finely divided form and adsorbed or supported on some suitable substrate such as, for example, carbon, alumina, and the like, although any handleable form of the catalyst which can be readily filtered from the reaction product may be used. Most preferably, platinum catalysts which can be obtained commercially adsorbed on carbon are used, and in particular, the Englehardt lot 11–646 platinum catalyst is used. The principal advantage of platinum over palladium is that the latter material converts part of the excess acetone to isopropanol under the conditions of reaction. This conversion to alcohol may constitute an undesirable side reaction, especially in a continuous process. Another consideration is that platinum appears to be more active for a given weight of metal.

The catalyst is used in a catalytic amount which is generally not less than about 0.02 gram per mol of the amine or nitro compound being alkylated. Where the catalyst is adsorbed on a substrate, adjustments must be made in the quantity of the material used so that at least a catalytic amount or about 0.02 grams of the catalyst per mol of the amine or its precursor is present, notwithstanding the quantity of the substrate on which it is adsorbed.

The pressure required for the reductive alkylation of amines or their precursors in accordance with this invention is at least about 500 p.s.i. but may be as high as about 1000 p.s.i. or higher. Preferably, however, the highest pressures which are practical to obtain should be used.

The temperature at which the reaction is carried out should be at least about 80° C. and may be as high as 125° C. or higher. However, at temperatures above about 125° C. the partial pressures of acetone, water and other components in the mixture become appreciable, and higher temperatures are generally not rquired to obtain rapid reaction.

In combination, and only in combination as set out herein, the foregoing critical requirements for the process in accordance with this invention result in a finished reaction within about 10 minutes and often even within half that time. Further, the conversion of the reactants into the finished product takes place at a rate of greater than 90% on a consistent and reproducible basis, while the yields obtained are consistently 95% or better. The unexpected advantage that inheres in the production of the product in a few minutes at a high degree of purity and a yield rate consistently above 95% has never before been achieved. As a consequence, no practical means for continuously reductively alkylating amines and their precursors on a production basis has been possible. It has now been found, however, that with the processes outlined herein, and within the critical limits set out in the foregoing passages, continuous production techniques are not only possible but commercially highly desirable. Further, practically and economically speaking, there is very little waste in the process of this invention since the reactants convert at such a high rate and the yields are even higher. Thus, an almost ideal system is approached in which the operator obtains from the system that which he put into it with very small energy or by-product loss.

In the practice of the invention, if the amine to be alkylated may be prepared by reduction, then its precursors, that is, the corresponding oxidation product may be used instead. Within this limitation, any suitable alkyl or aryl nitro, nitroso, hydrazo, and azo compound as well as any aryl azoxy, hydroxylamine and diazonium salt and any alkyl oxime, nitrile, acid amide or Schiff's base may be treated in accordance with this invention including, for example, nitrobenzene, nitromethane, nitroethane, nitropropanes, nitrobutanes, nitropentanes, nitrobenzenes, nitrotoluenes, nitrophenols, nitroanisoles, chlorinated nitrobenzenes, nitronaphthylenes, nitronaphthols, nitronaphthylamines, phenylnitropropanes and the like. Any suitable aromatic or aliphatic amine may also be used in the practice of the invention. Some such suitable amines are, for example, aniline, methylamine, ethylamine, propylamine, butylamines, amylamines, p-toluidine, p-anisidine, alpha-naphthylamine, betanaphthylamine, phenylpropylamines and the like, nitroso benzene, nitrosopentane, hydrazobenzene, dipropyl hydrazine, azobenzene, azobutane, azoxybenzene, phenylhydroxylamine, phenyl diazonium chloride, propyloxime, acetonitrile, propionitrile, acetic acid amide, benzalaniline, butyralaniline as well as any nitro, nitroso, nitrile, azo, hydrazo, azoxy, hydroxylamine, diazonium salt, oxime, acid amide, or Schiff's base precursor of any of the amines named herein. Most especially, however, this invention contemplates the reductive alkylation of aniline and/or nitrobenzene.

Any suitable ketone may be used in the reductive alkylation reaction of this invention. Some such suitable ketones are, for example, methylethyl ketone, methylpropyl ketone, methylbutyl ketone, methylamyl ketone, methylhexyl ketone, methylheptyl ketone, methyloctyl ketone, etc., diethyl ketone, ethylpropyl ketone, ethylbutyl ketone, ethylamyl ketone, ethylhexyl ketone, ethylheptyl ketone, etc., dipropyl ketone, propylbutyl ketone, propylamyl ketone, propylhexyl ketone, etc., dibutyl ketone, butylamyl ketone, butylhexyl ketone, etc. Other suitable but not necessarily equivalent ketones comprise cyclic ketones including cyclohexanone, benzophenone, etc., alkyl aryl ketones, alkylcycloalkyl ketones, diaryl ketones, aryl cycloalkyl ketones, etc., including compounds as acetophenone, ethylphenyl ketone, propylphenyl ketone, butylphenyl ketone, amylphenyl ketone, etc., methyl cyclohexyl ketone, ethyl cyclohexyl ketone, propyl cyclohexyl ketone, butyl cyclohexyl ketone, etc. It is understood that mixtures of ketones may be utilized when desired. Most especially, however, this invention contemplates the use of acetone.

For best results in the practice of this invention it has also been found that the reactor in which the reaction is carried out should be lined with a material inert to the reactants such as glass, Teflon, Kel-F, or a metal known to be inert to the components of the reaction mixture. A non-inert material such as stainless steel, for example, is generally corroded by the reactants to a certain extent and the contamination thus introduced into the reaction mixture causes a degeneration of the catalyst, cutting down on its useful lifetime as well as increasing processing operations in the regeneration of the catalyst.

The invention is further illustrated but is not intended to be limited by the following examples in which all parts and percentages are by weight unless otherwise specified.

EXAMPLE 1

About 2 mols of aniline, about 3 mols of acetone, about 4 grams of 1% platinum supported on carbon, Englehardt lot 11–646, about 4 grams of acetic acid and about 10 grams of water are charged into a 1 liter autoclave in a batch process. The equipment is closed and purged with nitrogen and then charged with hydrogen to the operating pressure of about 950 p.s.i. Reaction begins immediately.

Full heat is applied and the reactor is brought to a temperature of about 120° C. About ten minutes after the hydrogen is charged, the pressure is vented and full cooling is applied. The reaction mixture is withdrawn, filtered and analyzed; a yield of about 97.7% is obtained. The catalyst is washed in cold HCl, rinsed with water, dried and then recharged for the next run.

EXAMPLE 2

With reference to the drawing, aniline and acetone which may be preheated to the reaction temperature if desired, are fed in about a 1:1.5 molar ratio to the reactor through a high pressure pump, and feeds from the main tanks are adjusted to account for the recycle material being added. The catalyst can be introduced as water slurry through its own pump with care so that the catalyst is not exposed to the reaction material without the presence of hydrogen. The slurry is pumped in at a rate to maintain about a 10% level of water based on the weight of the reaction mixture an a concentration of about 2% based on the weight of the aniline of 1% platinum supported on carbon, taking care to compensate for the recycled catalyst. Vigorous stirring should be maintained inside the reactor to entrain as much hydrogen as is practical. A hydrogen pressure of between about 950 and about 1000 p.s.i. and a temperature of about 120° C. is maintained within the reactor. After reaction has taken place the product flows through a let-down valve which reduces the pressure and the catalyst is filtered, washed in cold concentrated hydrochloric acid and rinsed with clean water. The regenerated catalyst is then slurried in water (for example, about 1:5 by weight) and fed again into the process stream. A back-up filter should be used after the initial filtration to reclaim final traces of the catalyst from the product stream.

The cooled product stream readily forms two phases which can be separated continuously. The organic layer is sent to a still and the acetone and aniline are removed and recycled. The intermediate by-products if any are removed for disposal, and the N-isopropylaniline formed is distilled and stored.

Analysis shows that the conversion rate of aniline in the process is about 90% while the yield obtained is about 95%.

EXAMPLE 3

About 2 mols of nitrobenzene, about 3 mols of acetone, about 4 grams of 1% platinum adsorbed on carbon, Englehardt lot 11–646, about 4 grams of acetic acid and about 10 grams of water are charged into a liter autoclave in a batch process. The equipment is closed and purged with nitrogen and then charged with hydrogen to an operating pressure of about 950 p.s.i. Full heat is applied and the reactor is brought to a temperature of about 120° C. About ten minutes after the hydrogen is charged, the pressure is vented and full cooling is applied. The reaction mixture is withdrawn, filtered and analyzed; a yield of about 94% is obtained. The catalyst is washed in cold HCl, rinsed with water, dried and then recharged for the next run.

Although the foregoing examples are directed to the use of aniline with acetone and nitrobenzene with acetone, it is to be understood that any of the amines or oxidation precursors thereof as described herein can be substituted into any of the foregoing three examples and that any ketone mentioned herein as suitable may be substituted for the acetone used in the examples. Further, any variations may be made in the foregoing examples as set out in the specification.

Thus, it is to be understood that any of the components mentioned as suitable herein can be substituted for their counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A process for the continuous production of N-alkylated amines which comprises hydrogenating a mixture of two compounds, one being a member selected from the group consisting of aniline and nitrobenzene, and the other being acetone, in a ratio of acetone to aniline or nitrobenzene of at least about 1.1:1 to 1.5:1 in the presence of a catalytic amount of a catalyst selected from the group consisting of a platinum or a palladium catalyst, about 1.5 to 4.0 parts per 100 parts of aniline or nitrobenzene of a monocarboxylic acid having from 1 to 4 carbon atoms and about 1% to 20% by weight of the reaction mixture of water, at a temperature of about 80 to 125° C. and under a pressure of about 500 p.s.i. to 1000 p.s.i. for a period of time of less than about 10 minutes.

2. The process of claim 1 wherein the catalyst is regenerated by washing it with a cold acid selected from the group consisting of hydrochloric acid, hydrofluoric acid, hydrobromic acid, hydriodic acid, nitric acid and phosphoric acid and rinsing it with water.

3. The process of claim 1 wherein the catalyst is filtered from the product layer which separates into an organic phase and a water phase, the organic phase is distilled to remove the product, and unreacted acetone and aniline or nitrobenzene are recycled; the water phase is distilled and unreacted acetone is recycled; the catalyst is washed with an acid selected from the group consisting of hydrochloric acid, hydrofluoric acid, hydrobromic acid, hydriodic acid, nitric acid, and phosphoric acid, rinsed with water and recycled.

4. The process of claim 1 wherein the monocarboxylic acid is acetic acid.

5. The process of claim 1 wherein the reaction is carried out at about 120° C. under about 950 p.s.i. pressure in the presence of about 10% by weight of water, and about 4 parts of acetic acid.

References Cited

UNITED STATES PATENTS

| 3,187,046 | 1/1965 | Curtis | 260—570.8 |
| 2,380,420 | 7/1945 | Emerson | 260—577 |
| 2,414,031 | 1/1947 | Emerson | 260—577 X |

CHARLES B. PARKER, Primary Examiner

C. F. WARREN, Assistant Examiner

U.S. Cl. X.R.
260—576, 689, 690